US006894827B2

(12) United States Patent
Mendlovic et al.

(10) Patent No.: US 6,894,827 B2
(45) Date of Patent: May 17, 2005

(54) OPTICAL LINEAR PROCESSOR

(75) Inventors: David Mendlovic, Petach-Tikva (IL); Shay Levavi, Haifa (IL); Naim Konforti, Holon (IL); Aviram Sariel, Ramot-Hashavim (IL); Yaron Hefetz, Herzelia (IL)

(73) Assignee: Lenslet Ltd., Herzelia Pituach (IL)

( * ) Notice: Subject to any disclaimer, the term of this patent is extended or adjusted under 35 U.S.C. 154(b) by 173 days.

(21) Appl. No.: 10/030,460

(22) PCT Filed: May 3, 2001

(86) PCT No.: PCT/IL01/00398

§ 371 (c)(1),
(2), (4) Date: May 28, 2002

(87) PCT Pub. No.: WO01/84262

PCT Pub. Date: Nov. 8, 2001

(65) Prior Publication Data

US 2002/0164108 A1 Nov. 7, 2002

(30) Foreign Application Priority Data

May 3, 2000 (IL) ........................................ 135944

(51) Int. Cl.[7] ........................ G02F 1/365; G02F 1/035; G06K 9/36; G06K 9/74

(52) U.S. Cl. ....................... 359/332; 359/244; 382/210; 382/277

(58) Field of Search ................................ 359/326–332, 359/238–244; 382/210–214, 232, 248, 276–283

(56) References Cited

U.S. PATENT DOCUMENTS

| | | | | |
|---|---|---|---|---|
| 3,889,233 A | * | 6/1975 | Ogiwara | 382/210 |
| 4,603,398 A | | 7/1986 | Bocker et al. | 708/839 |
| 4,607,344 A | | 8/1986 | Athale et al. | 708/835 |
| 4,697,247 A | | 9/1987 | Grinberg et al. | 708/191 |
| 4,986,640 A | | 1/1991 | Athale | 359/107 |
| 5,005,954 A | | 4/1991 | Liu | 359/107 |
| 5,099,448 A | | 3/1992 | Myers et al. | 708/835 |
| 5,297,068 A | | 3/1994 | Guilfoyle et al. | 708/191 |
| 5,321,639 A | | 6/1994 | Krishnamoorthy et al. | 708/7 |
| 5,333,117 A | | 7/1994 | Ha et al. | 708/191 |
| 5,537,492 A | | 7/1996 | Nakajima et al. | 382/232 |
| 5,590,367 A | * | 12/1996 | Lin et al. | 359/11 |
| 5,675,670 A | | 10/1997 | Koide | 382/281 |
| 5,784,309 A | | 7/1998 | Budil | 708/835 |
| 6,025,950 A | | 2/2000 | Tayebati et al. | 359/244 |
| 6,178,020 B1 | | 1/2001 | Schultz et al. | 359/107 |

FOREIGN PATENT DOCUMENTS

EP 0 547 594 6/1993 ............ G06E/3/00

OTHER PUBLICATIONS

Kornreich, P. G. et al.; "DEFT: Direct Electronic Fourier Transforms of Optical Images;" Proceedings of the IEEE; vol. 62; No. 8; Aug. 1974; pp. 1072–1087.

Teijido,J. M. et al.; "Design Methods for Illumination Light Pipes;" intended for publication in: Illumination and Source Engineering,Proceeding of SPIE; vol. 3428; 1998; pp. 1–6.

(Continued)

*Primary Examiner*—John D. Lee
(74) *Attorney, Agent, or Firm*—Fenster & Company

(57) ABSTRACT

An optical signal processor for transforming a first vector into a second vector comprising: a plurality of linear light sources each of which provides light having an intensity responsive to a different component of the first vector, a spatial light modulator comprising a plurality of modulation zones each of which zones receives light from substantially only one of the light sources and transmits light in proportion to a transmittance that characterizes the modulation zone; and at least one light detector for each component of the second vector that receives light transmitted from a plurality of modulation zones, each of which is illuminated by light from a different light source, and generates a signal responsive to the received light that represents a component of the second vector.

45 Claims, 3 Drawing Sheets

OTHER PUBLICATIONS

Teijido,J. M. et al.; "Illumination Light Pipe Using Micro–Optics as Diffuser;" 1996; Proceedings Europto series, Holographic and Diffractive Techniques,SPIE 2951; pp. 146–155.

Teijido,J. M. et al.; "Design of a Non–Conventional Illumination System Using a Scattering Light Pipe;" 1996; Design and Engineering of Optical Systems, Proceedings Europto series, SPIE 2774; pp. 747–756.

Schmid, V. et al.; "Microlens Array Processor with Programmable Weight Mask and Direct Optical Input;" Apr. 1999; Part of the SPIE Conference on Optical Pattern Recognition, SPIE; vol. 3715; pp. 175–184.

Kirk, A. G. et al.; "Experimental Implementation of an Optoelectronic Matrix–Matrix Multiplier which Incorporates Holographic Multiple Imaging;"Dec. 1992; Optical Computing and Processing; vol. 2; No. 4; pp. 293–304.

Yatagai,T.; "Optical Computing in Japan;" Oct. 1998; Future Generation Computer Systems; vol. 4; No. 3; pp. 177–187;XP111373.

Wong,K. W. et al.; "Optical Cosine Transform Using Microlens Array and Phase–Conjugate Mirror;" May 1992; Japanese Journal of Applied Physics; vol. 31; pp. 1672–1676.

Goutin,P. et al.; "Some New Results in Hybrid Acousto–Optic Processing;" Oct. 1992; Proceedings of the IEEE Ultrasonics Symposium;vol. 1; pp. 493–496.

Feitelson,D.; "Optical Computing;"Chapter"Optical Image and Signal Processing;" MIT Press 1988; pp. 102–104 and 117–129.

Reinhorn,S. et al.; "Compact Optical Crossbar Switch;" Feb. 10, 1997; Applied Optics; vol. 36; No. 5; pp. 1039–1044.

* cited by examiner

OPTICAL LINEAR PROCESSOR

FIELD OF THE INVENTION

The invention relates to methods and apparatus for performing a linear transformation of a vector and in particular to performing such a transformation optically.

BACKGROUND OF THE INVENTION

Discrete linear transforms are explicit and/or implicit components of many different applications and types of applications. They are used in image compression and enhancement, logical operations and neural networks and describe such functions as routing signals that are input at a first set of terminals so that they are output at different desired terminals of a second set of terminals.

A general discrete linear transform transforms a first tensor "X" into a second tensor "Y". The transformation may be represented by an equation of the form $Y_{j1 \ldots jm}=\Sigma W(j1 \ldots jm:i \ldots in)\, X_{i1 \ldots in}$, where $Y_{j1 \ldots jm}$ and $X_{i1, \ldots in}$ are components of tensors X and Y respectively, i1 . . . in and j1 . . . jm are integer indices and n and m are integers defining the order of the tensors. In the above equation and equations that follow, the convention is that repeated indices are summed over. By appropriately "reindexing", tensors X and Y can be parsed into vectors having components indicated by a single index. If components of X and Y after reindexing are represented by $x_i$ and $y_j$ respectively, then the linear transformation of X to Y can be represented by $y_j=\Sigma W(j,i)x_i$. The last equation represents the transform of vector "x" into vector "y" by matrix multiplication.

Many common applications, such as JPEG and MPEG applications for compression of still and moving images, involve discrete linear transforms that require a very large number of arithmetical operations. For example, performing a discrete cosine transform (DCT) of a 1000×1000 pixel image in a JPEG routine requires on the order of $6\times10^6$ multiplications. Optical signal processing methods that perform operations required by linear transformations rapidly and in parallel offer methods for executing such transformations substantially more rapidly than conventional computational methods. In particular, optical signal processing can be used to rapidly and efficiently perform the basic function of multiplying a vector by a matrix.

Optical methods for performing linear transformations are described in a book entitled "Optical Computing" by D. G. Feitelson, MIT Press, 1988, the disclosure of which is incorporated herein by reference. FIG. 4.2 in the book schematically shows an optical matrix-vector multiplier. An article entitled, "Compact Optical Crossbar Switch" by S. Reinhorn et al; Applied Optics, Vol. 36, No 5; 10 February 97, the disclosure of which is incorporated herein by reference, describes a planar optical crossbar switch that operates to switch an optical signal from any one of N light sources to any one of N detectors.

SUMMARY OF THE INVENTION

An aspect of some embodiments of the present invention relates to providing an improved optical vector processor, hereinafter referred to as a "vector processor".

An aspect of some embodiments of the present invention relates to providing a vector processor in which light is transmitted from a first optical element to a second optical element by scattering or generating light in the first optical element so that it exits the first optical element and enters the second optical element.

An optical vector processor in accordance with an embodiment of the present invention comprises a plurality of preferably identical, relatively long, parallel, leaky light pipes formed from a suitable optically transparent material such as glass or plastic. Each light pipe has end surfaces and a longitudinal surface running the length of the light pipe. Light leaks from the light pipe along at least a portion of the longitudinal surface of the light pipe. The portion, hereinafter referred to as a "transmission window", through which light leaks may be continuous in the direction along the length of the light pipe or may be segmented. In some embodiments of the present invention, the longitudinal surface of the light pipe is coated with a light reflecting material, such as a metal or suitable dielectric, except at the transmission window. In some embodiments of the present invention the leaky light pipes may be replaced by linear light sources such as for example a florescent light source.

The light pipes are positioned one besides the other so that the transmission windows of all the light pipes are parallel. In some embodiments the light pipes are arrayed in a coplanar array. Optionally the ends of the light pipes are aligned. In some embodiments the transmission windows of the light pipes in the array all face a same plane parallel to the plane of the light pipe array.

A light source, such as a VCSEL or a LED, is optically coupled to an end surface of each light pipe. The light source provides a beam of light that enters the light pipe through the end surface and travels the length of the light pipe. In some embodiments of the present invention regions of the end surface coupled to the light source and the end surface that is not coupled to the light source are covered with a reflecting material. Light from the beam of light is reflected from the end surfaces and repeatedly travels the length of the light pipe back and forth. The light pipe is seeded, using methods known in the art, with particles that interact with and scatter photons in the light beam. At each point along the length of the light pipe the scattering particles scatter a fraction of the light in the beam, some of which scattered light exits the light pipe through the transmission window. The transmission window therefore appears as a linear light source having intensity that is proportional to the intensity of light emitted by the light source.

The transmission window of each light pipe is aligned with a different column of modulation zones of a spatial light modulator (SLM) comprising a row-column array of a modulation zones and each modulation zone in a row of the SLM is illuminated by light from a different one of the light pipes. Light from the transmission window of each light pipe illuminates all the modulation zones of the column with which it is aligned.

Light from all the light pipes passing through a same single row of modulation zones of the SLM is collected and the amount of the collected light sensed by at least one light detector. If the transmittances of the modulation zones are represented by $A_{ij}$ and the intensity of light from the j-th light pipe illuminating the j-th modulation zone of the i-th row is represented by $I_j$, then the amount of the collected light from the i-th row, "$C_i$" is proportional to $C_i=\Sigma A_{ij}I_j$.

Assuming that the $A_{ij}$ are proportional to elements of a matrix and the $I_j$ proportional to components of a vector $x_j$, then the $C_i$ are proportional to components of a vector into which the matrix transforms the vector $x_j$.

In some embodiments of the present invention, the vector processor operates as an optical switch (which of course is multiplication of a vector by a matrix with elements that are either 1 or 0) that routes optical signals from a particular column (i.e. from the light pipe illuminating the particular column) to a particular row (i.e. at least-one detector that collects the light from the row). In these embodiments the modulation zones operate as optical switches that either transmit or block light.

If all the elements of a matrix that are represented by transmittances of modulation zones in a same column of the SLM are equal, when the column is illuminated by light from its corresponding light pipe, signals responsive to light transmitted through each of the modulation zones should be equal. However, intensity of emitted light along a transmission window of light pipe generally decreases with distance from the light source coupled to the end of the light pipe. Modulation zones in the column that are closer to the light source are exposed to greater illumination from the transmission window than modulation zones in the column farther from the light source. As a result, if the equal matrix elements are represented by equal transmittances, intensity of light transmitted through modulation zones closer to the light source is greater than intensity of light transmitted through modulation zones farther from the light source. If the detectors that provide signals responsive to light transmitted through each of the modulation zones have a same sensitivity, signals generated by the detectors will not be equal.

In some embodiments of the present invention, transmittances of modulation zones are adjusted to compensate for non-uniformity in intensity of light along transmission windows of light pipes. For example, in a column of modulation zones, modulation zones representing equal matrix elements have transmittances that are inversely proportional to intensity of light with which they are illuminated.

In some embodiments of the present invention sensitivities of the detectors that provide signals responsive to intensity of light from the different modulation zones are adjusted to compensate for non-uniformity of light intensity along the light pipe.

It should be noted, that the same at least one detector senses light transmitted through all the modulation zones in a same row of modulation zones. Furthermore, assuming that the light sources at the ends of the light pipes are all located along a same side of the light pipe array, a light detector that collects light from a row of modulation zones, collects light from each light pipe at a same distance from the light pipe's light source. In addition, since the light pipes are substantially identical, changes in light intensity as a function of distance along a light pipe is described by a same function for all the light pipes. Therefore, if the detectors are properly adjusted to substantially compensate for non-uniformity of light intensity along one of the light pipes, the detectors are substantially adjusted to compensate for non-uniformity of light intensity for all of the light pipes in the array.

In some embodiments of the present invention, the signals provided by the detectors are corrected electronically to adjust for differences in intensity of light along the light pipes.

In some embodiments of the present invention, dimensions of the modulation zones parallel to the lengths of the light pipes are inversely proportional to the relative intensity of the light emitted from the transmission windows at the location of the modulation zones. As a result, the amount of light transmitted through each modulation zone for a same transmittance is substantially the same.

In some embodiments of the present invention, the attenuation length due to absorption and scattering of light emitted by the light sources is controlled, using methods known in the art, so that decrease in light intensity along the light pipes is moderate.

In some embodiments of the present invention, the density of scattering particles is increased along the length of the light pipe so that the intensity of light through the transmission window is substantially uniform along the length of the window.

Methods for producing linear light pipes that receive light from a quasi-point source such as an LED or laser and provide substantially uniform illumination from an extended transmission window are known in the art. An article entitled "Design Methods for Illumination Light Pipes" by J. M. Teijido, et al, intended for publication in Illumination and Source Engineering, Proceeding of SPIE Vol. 3428 (1998), the disclosure of which is incorporated herein by reference, describes methods of producing light pipes suitable for the practice of the present invention. Other articles that describe methods for producing light pipes appropriate for practice of the present invention are "Illumination Light Pipe Using Micro-Optics as Diffuser", by by J. M. Teijido, et al, SPIE 2951, 146–155 (1996) and "Design of a Non-Conventional Illumination System Using a Scattering Light Pipe" by J. M. Teijido, et al SPIE 2774, 747–756 (1996), which articles are incorporated herein by reference.

In some embodiments of the present invention, light pipes are formed from a material that exhibits luminescence when excited, for example, by an electromagnetic field or by optical pumping. Light that exits transmission windows of the light pipes is generated by exciting luminescence of the material in the light pipe.

In some embodiments of the present invention, light is collected from each row of modulation zones of the SLM by a single light detector that has a light collecting aperture having a size and shape substantially the same as the size and shape of the row of modulation zones. Optionally, the aperture is pressed to the row of modulation zones to collect light from the modulation zones in the row.

In some embodiments of the present invention light is collected from the modulation zones of a row of modulation zones by a light pipe that pipes the light to a suitable detector. The light pipe has an aperture for collecting light, which is pressed to the row of modulation zones, and has a size and shape substantially the same as the size and shape of the row of modulation zones.

In some embodiments of the present invention, light transmitted through the SLM is collected by a cylindrical lens that is oriented with its axis perpendicular to the rows of the SLM. The lens focuses light transmitted through the modulation zones in each row of the SLM to a different detector.

There is therefore provided in accordance with an embodiment of the present invention, an optical signal processor for transforming a first vector into a second vector comprising: a plurality of linear light sources each of which provides light having an intensity responsive to a different component of the first vector; a spatial light modulator comprising a plurality of modulation zones each of which zones receives light from substantially only one of the light sources and transmits light in proportion to a transmittance that characterizes the modulation zone; and at least one light detector for each component of the second vector that receives light transmitted from a plurality of modulation zones, each of which is illuminated by light from a different light source, and generates a signal responsive to the received light that represents a component of the second vector.

Optionally, the modulation zones are configured in an array of columns and rows of modulation zones. Optionally the array of modulation zones is a rectangular array. Alternatively or additionally all the modulation zones in a same column of modulation zones are optionally illuminated by light from a same light source.

Optionally, the at least one detector for each second vector component receives light transmitted from all the modulation zones in a different one of the rows of modulation zones. Optionally, the at least one detector for each row of modulation zones has an aperture for collecting light that has a shape and size substantially equal to the shape and size respectively of the row of modulation zones from which it receives light. Optionally, the aperture is contiguous with the row of modulation zones.

In some embodiments of the present invention efficiency of light transfer between a light source and a light detector for light at a wavelength that characterizes light provided by the light sources is less than a predetermined threshold efficiency $\epsilon$ that satisfies a relation $\epsilon^2 \leqq 4/(N^3 \times SNR)$ where N is a number of the plurality of light sources and SNR is a desired signal to noise ratio resulting from crosstalk.

In some embodiments of the present invention the optical processor comprises optics that receives light transmitted from all the modulation zones in the spatial light modulator and images light from all modulation zones in each row of modulations zones to the row's at least one detector. Optionally, the optics comprises a cylindrical lens that receives light transmitted from all the modulation zones and has its focal line substantially parallel to the rows of modulation zones and wherein the at least one light detectors for the modulation zone rows are positioned in a linear array perpendicular to the focal line so that light received from the modulation zones in a same row of modulation zones is imaged on a same one of the at least one light detectors.

In some embodiments of the present invention the optical processor comprises a different collecting light pipe for each row of modulation zones in the spatial light modulator that receives light transmitted from the modulation zones in the row of modulation zones and pipes the received light and/or light generated in the light pipe responsive to the received light to the at least one light detector for the row of modulation zones. Optionally, efficiency of light transfer between a light source and a light detector for light at a wavelength that characterizes light provided by the light sources is less than a predetermined threshold efficiency s that satisfies a relation $\epsilon^2 \leqq 4/(N^3 \times SNR)$ where N is a number of the plurality of light sources and SNR is a desired signal to noise ratio resulting from crosstalk.

Alternatively or additionally, light provided by the light sources is characterized by a first wavelength and the collecting light pipes are provided with wavelength converters that convert light received by the light pipes from the modulation zones to light characterized by a second wavelength. Optionally the second wavelength is longer than the first wavelength. Alternatively or additionally, surface areas of the light pipe are optionally coated with a coating that transmits light at the first wavelength and is highly reflective for light at the second wavelength.

In some embodiments of the present invention the collecting light pipe is a linear light pipe having two end surfaces and a light collecting surface that is a longitudinal surface region of the light pipe through which surface region light transmitted from the modulation zones in the row of modulation zones enters the light pipe. Optionally, the light pipe is a rectangular solid having four rectangular side surfaces, one of which side surfaces is the light collecting surface. Optionally, the light collecting surface has a shape and size substantially the same as the shape and size of the area of the row of modulation zones from which it collects light. Alternatively or additionally, the light collecting surface is contiguous with the row of modulation zones from which the light pipe collects light.

In some embodiments of the present invention the at least one light detector for a second vector component comprises a single light detector that is coupled to an end surface of the collecting light pipe. In some embodiments of the present invention, the at least one light detector comprises a light detector coupled to each end surface of the collecting light pipe.

In some embodiments of the present invention, the relative amounts of light provided by any two light sources of the plurality of light sources for components of the first vector having a same value are adjusted so that a difference in an amount of light transmitted from the light sources through modulation zones having a same transmittance that reaches the at least one detector for each of the modulation zones is reduced.

In some embodiments of the present invention, desired transmittances of modulation zones illuminated by a same light source are adjusted to compensate for differences in intensity of light along the length of the of the light source that illuminates the modulation zones.

In some embodiments of the present invention, a ratio of areas of any two modulation zones illuminated by a same light source is substantially inversely proportional to the relative amounts of light that the modulation zones receive from the light source.

In some embodiments of the present invention, the relative sensitivities of any two first and second at least one detectors are adjusted to reduce a difference in output signals that they provide when they receive light from modulation zones having a same transmittance that are illuminated by a same light source.

In some embodiments of the present invention, the transmittance of each modulation zone in the spatial light modulator is fixed. In some embodiments of the present invention, the transmittance of each modulation zone in the spatial light modulator is controllable.

In some embodiments of the present invention, each of the at least one light sources comprises a source light pipe that provides light from a longitudinal surface thereof to illuminate modulation zones of the spatial light modulator. Optionally the optical signal processor comprises a light emitter coupled to an end surface of the source light pipe that illuminates the end surface with intensity of light responsive to a component of the first vector. Optionally, the source light pipe is provided with light scattering elements. Optionally, the density of the particles increases with distance from the end surface so as to improve uniformity of intensity of light exiting the longitudinal surface as a function of distance from the end surface.

In some embodiments of the present invention, the light source is formed from a material that exhibits luminescence. Optionally, the optical signal processor comprises a light emitter that illuminates the luminescent material to excite luminescence therein having intensity responsive to a component of the first vector. Alternatively, the optical signal processor comprises a source of electromagnetic field that generates an electromagnetic field in the luminescent material to excite luminescence therein having intensity responsive to a component of the first vector.

In some embodiments of the present invention, each of the at least one light source comprises a linear fluorescent light emitter.

There is further provided in accordance with an embodiment of the present invention, a method for transforming a first vector into a second vector comprising: representing each component of the first vector by intensity of light provided by a linear light source; transmitting light from each light source through a plurality of modulation zones each of which transmits light in proportion to a transmittance that characterizes the modulation zone; and using light transmitted by all the modulation zones to generate a plurality of signals, each of which represents a different component of the second vector and wherein each signal is responsive to light transmitted by at least one of the modulation zones.

Optionally, no two signals are responsive to light transmitted by a same modulation zone. Alternatively or additionally, no signal is responsive to light from more than one modulation zone illuminated with light from a same light source. In some embodiments of the present invention, each light source illuminates a same number of modulation zones. In some embodiments of the present invention, each signal is substantially proportional to a total amount of light transmitted by all of the at least one of the modulation zones. In some embodiments of the present invention, each signal is responsive to light transmitted by a plurality of the modulation zones.

There is further provided in accordance with an embodiment of the present invention, a method of propagating an optical signal in a light pipe, the method comprising: generating an optical signal with light characterized by a first wavelength for which light is substantially not reflected at the surface of the light pipe; transmitting at least a portion of the light in the optical signal through a surface region of the light pipe so that it is enters the light pipe; and converting the first wavelength light that enters the light pipe to light characterized by a second wavelength that is highly reflected by the surface of the light pipe.

There is further provided in accordance with an embodiment of the present invention, a method of preventing cross talk between first and second light pipes optically coupled at first and second optical junctions to a same third light pipe so as to input optical signals to the third light, the method comprising: generating optical signals in the first and second light pipes that are input to the third light pipe with light characterized by a first wavelength for which light is transmitted at the first and second optical junctions; converting the first wavelength light that enters the third light pipe to light characterized by a second wavelength that not transmitted through the first and second optical junctions. Optionally, the second wavelength light is reflected at each of the first and second optical junctions. Additionally or alternatively, the second wavelength light is absorbed at or in the vicinities of the first and second optical junctions.

BRIEF DESCRIPTION OF FIGURES

The present invention will be more clearly understood from the following description of embodiments thereof read with reference to figures attached hereto. In the figures, identical structures, elements or parts that appear in more than one figure are generally labeled with the same numeral in all the figures in which they appear. Dimensions of components and features shown in the figures are chosen for convenience and clarity of presentation and are not necessarily shown to scale. The figures are listed below.

DETAILED DESCRIPTION OF EMBODIMENTS

Figure 1B:
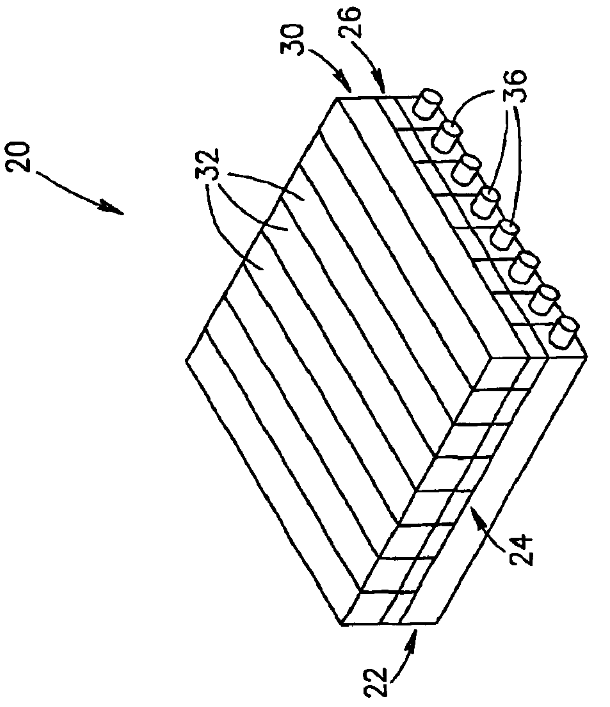
FIGS. 1A and 1B schematically show, respectively, a partial exploded view of an optical vector processor and a view of the vector processor assembled, in accordance with an embodiment of the present invention.
Figure 1A:
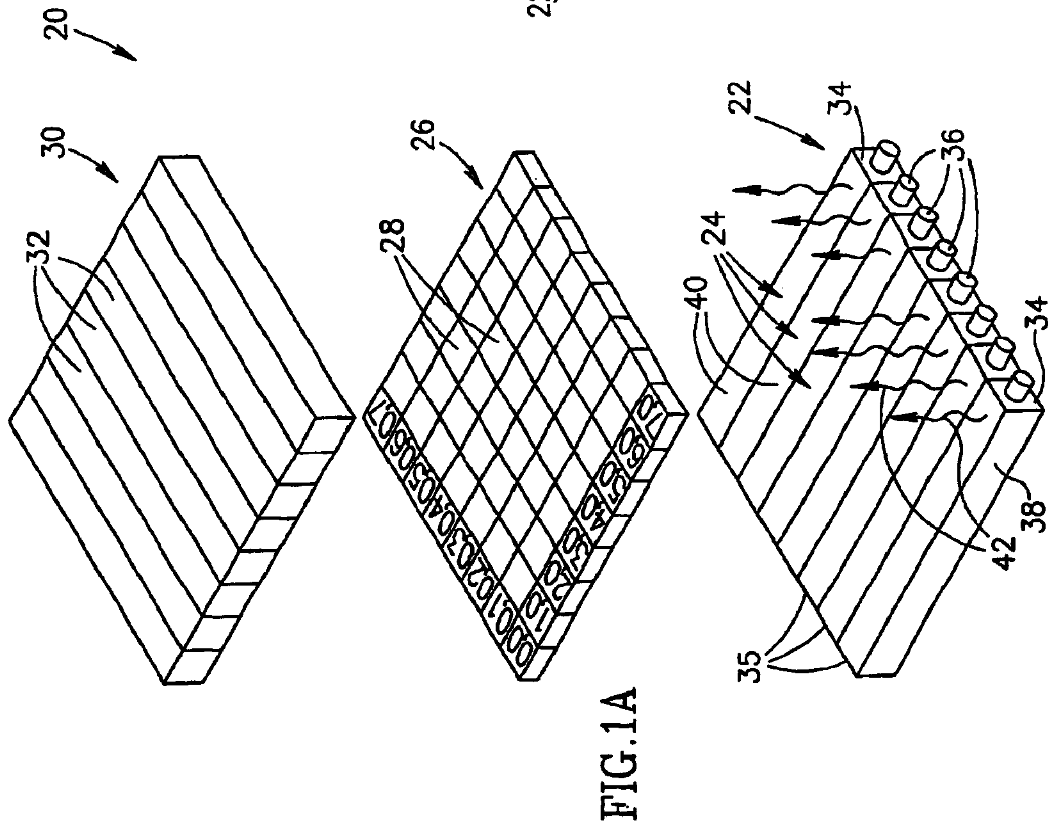

FIG. 1A schematically shows a partially exploded view of an optical vector processor 20 in accordance with an embodiment of the present invention. FIG. 1B schematically shows vector processor 20 assembled.

Referring to FIG. 1A, processor 20 comprises an array 22 of, optionally, identical light pipes 24, an SLM 26 comprising a row-column array of modulation zones 28, and an array 30 of light detectors 32.

By way of example, light pipe array 22 is shown as a square array of eight light pipes 24. In some embodiments of the present invention light pipes 24 are rectangular solids having a square cross section and end surfaces 34 and 35. A light source 36 is coupled to end surface 34 of each light pipe 24. Each light pipe 24 has three rectangular side surfaces 38 (only one of which for one of light pipes 24 is shown) that are covered with a light reflecting coating (not shown) that reflects light emitted by light sources 36. A rectangular surface 40, i.e. a transmission window 40, of each light pipe 24 transmits light emitted by light sources 36. In some embodiments of the present invention regions of end surfaces 34 that are not in contact with light sources 36 and end surfaces 35 of light pipes 24 are covered with a reflecting coating.

A controller (not shown) controls each light source 36 to emit light at a desired intensity. In some embodiments of the present invention, the controller controls each light source 36 to emit pulses of light having a desired pulse length and repetition rate so that the light source provides a desired average light intensity. Light emitted by a light source 36 travels along the light pipe 24 to which it is coupled and is reflected back and forth between end surfaces 34 and 35 of the light pipe. Each light pipe 24 comprises particles (not shown) that scatter light from its light source 36 as the light rebounds between its end surfaces 34 and 35. The scattered light has a substantially uniform angular distribution and exits the light pipe through the light pipe's transmission window 40. The intensity of light exiting transmission window 40 is proportional to the intensity of light emitted by the light pipe's light source 36.

It is to be noted that light pipes having shapes different from light pipes 24 are possible and can be advantageous in the practice of the present invention. For example, in some embodiments of the present invention the cross-section of each light pipe is elliptical. The transmission window of the light pipe is a cylindrical surface that has an arc of the ellipse as a directrix and extends substantially the length of the light pipe. The cylindrical surface collimates scattered light exiting the light pipe. In some embodiments the cross section may be circular or semicircular.

In FIG. 1A, a wavy arrow 42 indicates scattered light exiting a light pipe 24. Arrows 42 are shown having different lengths to indicate, by way of example, a situation in which light sources 36 are controlled to emit light at different desired intensities so as to provide different desired intensities of scattered light from transmission windows 40. (One of light sources 36 is turned off and transmission window 40 of its light pipe 24 is shown without an arrow 42.)

SLM 26 is, by way of example, a square array in which modulation zones 28 are optionally square. A particular modulation zone in SLM 28 is identified by its row and column position in the SLM. Some of modulation zones 28 in FIG. 1A are shown labeled with their row and column positions. The first numeral in a labeled modulation zone 28 represents the row position of the modulation zone and the second numeral the column position of the modulation zone.

Many different types of SLMs suitable for practice of the present invention are known in the art and readily available or manufactured. For example, SLM 26 might be a printed or a photographic SLM in which the transmittances of modulation zones 28 are fixed. Alternatively, SLM might be a liquid crystal SLM in which the transmittances of the modulation zones can be changed as required. In addition, shapes and sizes of modulation zones 26 can be other than shown in FIG. 1A. For example, modulation zones 26 can be circular or rectangular or have irregular shapes. With regions of SLM 26 between modulation zones opaque to light provided by light sources 36.

Each column of modulation zones 28 is aligned and, optionally, contiguous (as shown in FIG. 1B) in the assembled vector processor 20 with a transmission window 40 of a single light pipe 24. Scattered light emanating from the transmission window 40 of a light pipe 24 illuminates substantially only the modulation zones 28 of the column with which it is aligned. Let a particular light pipe 24 in light pipe array 22 be designated by the numeral designating the column with which the light pipe is aligned. If the transmittance of the ij-th modulation zone is represented by $A_{ij}$ and the scattered light intensity emanating from transmission window 40 of light pipe j is $I_j$ then the intensity of light transmitted through the modulation zone is equal to $A_{ij}I_j$.

In some embodiments of the present invention, each light detector 32 in light detector array 30 has dimensions substantially equal to dimensions of a row of modulation zones 28 in SLM 26 and is aligned and optionally contiguous (as shown in FIG. 1B) with a single row of SLM 26. Each light detector therefore collects light transmitted through all the modulation zones 28 of the row of modulation zones that it contacts. If a light detector 32 is identified by the numeral identifying the row of SLM 26 with which the detector is aligned, and the intensity of light collected by the i-th detector is represented by $C_i$ then $C_i=\Sigma A_{ij}I_j$. Vector processor 20 operates to multiply the set of values $I_j$ by the matrix $A_{ij}$ to generate the set of values $C_i$.

The above equations assume that intensity of light emanating from a transmission window 40 of a light pipe 24 is constant along the length of the light pipe's transmission window 40, i.e. in $I_j$ is independent of i. However, the intensity of scattered light transmitted through a transmission window 40 of a light pipe 24 may not be uniform. In many cases intensity of light emitted through a transmission window tends to decrease as distance from the light source 36 coupled to the light pipe increases.

Assume, that the light from the transmission window 40 of the j-th light pipe 24 is described by a function $I_j f(d)$, where d is the distance along the light pipe from the light source 36 coupled to the light pipe and f(d) is a "form factor" function that describes a dependence of the intensity of light on d. Assuming that all the light pipes 24 are substantially identical, the form factor f(d) is substantially the same for all light pipes 24 and substantially independent of j (i.e. the index designating a column in SLM 26 and the light pipe 24 aligned with the column). The intensity of light collected by the i-th detector 32 therefore becomes $C_i=\Sigma A_{i,j}f(d_i)I_j$ where $d_i$ is a suitably chosen distance of the i-th row from a light sources 36 for which the value of $f(d_i)$ is substantially equal to an average of f(d) in the region of the i-th row. (It should be noted that f(d) can be determined experimentally and or calculated based on design parameters of the light pipes and/or of light sources used to illuminate the light pipes.) In order for vector processor 20 to operate properly in transforming a first vector into a second vector, adjustments must be made to compensate for dependence of $C_i$ on f(d) and/or to reduce non-uniformity in light intensity from transmission windows 40 that gives rise to f(d).

Different methods, in accordance with embodiments of the present invention, can be used to reduce and compensate for non-uniformity of light intensity from transmission windows 40 if it is present. In some embodiments of the present invention, the attenuation length due to absorption and scattering of light emitted by light sources 36 in the material and at the surfaces of light pipes 24 is controlled to reduce non-uniformity in light intensity from transmission windows 40. (Attenuation length is defined as the length along the light pipe, assuming an infinitely long light pipe, over which intensity of light that enters the light pipe drops to 1/e of its entrance intensity.) In some embodiments of the present invention transmittances of modulation zones 28 are adjusted to compensate for non-uniformity of light from a light pipe transmission window 40. For example, in accordance with some embodiments of the present invention, transmittances for modulation zones 28, which would normally be set equal to $A_{ij}$ if light emitted from transmission windows 40 were substantially uniform, are set equal to $A_{ij}/f(d_i)$.

In some embodiments of the present invention, sensitivity of the i-th detector is reduced by a factor $f(d_i)$ to compensate for non-uniformity in light emitted from transmission windows 40 of light pipes 24.

In some embodiments of the present invention, concentration of scattering particles in light pipes 24 is controlled so that the density of scattering particles in a light pipe 24 increases with distance from its light source 36 to reduce non-uniformity of light from transmission windows 40.

In some embodiments of the present invention, widths of rows of modulation zones 28 i.e. the dimension of the rows parallel to light pipes 24, are determined so as to compensate for non-uniformity in light emitted from transmission windows 40 of light pipes 24. The relative width of the i-th row is determined to be proportional to the inverse of $f(d_i)$.

By way of a numerical example, a vector processor, in accordance with an embodiment of the present invention, similar to vector processor 20 might comprise a square light pipe array 22 comprising 64 light pipes 24. In some embodiments of the present invention each light pipe might have a length of 16 mm and a square cross section having a side equal to 250 microns. Light pipe array 22 would be 16 mm on a side. Each light pipe 24 might be constructed from glass or an appropriate polymer such as perspex, fishing line or tennis string. In some embodiments of the present invention, light pipes 24 might comprise a rigid sealed shell filled with an appropriate liquid such as a colloidal solution, for example a mixture of milk and water.

A matching SLM 26 might comprise an array of 64×64 square modulation zones 28, each 250 microns on a side. Each light pipe 24 therefore illuminates a column of 64 modulation zones 28 and each modulation zone 28 in the column is illuminated by light from a 250 micron length of the light pipe.

Detector array 30 might comprise 64 detectors each having a rectangular light collecting aperture 0.250×0.250×64 =mm$^2$. Light detectors having apertures as large as 5 mm are available. For example, Edmund Industrial Optics (a division of Edmund Scientific) gives specifications for a detector having a catalogue number, K54-520, on page 258 of its catalogue for the year 2000 that has an aperture equal to 5.1 mm$^2$. Assuming that detector array 30 and SLM 26 have thicknesses equal to about the thickness of light pipe array 22 then the volume of the vector processor is less than 0.2 cm$^3$.

The vector processor is suitable for performing a DCT transformation of an 8×8 pixel block of an image. Assume that it is desired to perform such DCT transformations with the vector processor at a rate of about 100 Mhz, i.e. that a DCT transformation is to be performed in a "cycle" time of about $10^{-8}$ seconds. Assume further, that the vector processor is powered by light sources 36 that generate light having a wavelength of about 1 micron and can provide an optical output in a ranger from about 0.1 mW to about 0.5 mW.

The number of photons per second, "NP", that a light source 36 injects into a light pipe 24 may be estimated from the formula NP=Pλ/hc, where P is the optical power output of the light source, λ is the wavelength of the light emitted by the light source, h is Planck's constant and c is the speed of light. For P=0.1 mW a light source 36 injects about $5\times10^{14}$ photons per second into the light pipe 24 to which it is coupled.

If the attenuation length of the light in light pipes 24 is about 48 mm and end surfaces 34 and 35 are 50% reflective, then when a light source 36 illuminates its light pipe 24, intensity of light from the light pipe's transmission window 40 near end surface 35 will be about 85% of that near end surface 34. Assume that 50% of the attenuation of the light in a light pipe 24 is due to scattering that results in light leaving the light pipe through its transmission window 40. Then about 0.0035 of the number of photons injected by a light source 36 into a light pipe 24 are emitted through each 250 microns of the transmission window 40 of the light pipe. The total number of photons exiting the light pipe through its transmission window is about 22% of the total number injected.

As a result, when a light source 36 couples light to its light pipe 24 at an optical output of 0.1 mW, in a cycle time of $10^{-8}$ seconds each 250 microns of the transmission window emits about $5\times10^{14}\times10^{-8}\times0.0035\sim17{,}500$ photons. Each modulation zone 28 in the row of modulation zones illuminated by the light pipe is therefore illuminated by about 17,500 photons in a cycle time of the vector processor. By varying the optical output of light sources 36 between 0.1 and about 0.4 mW, 256 gray levels of illumination can be provided by each light pipe 24. (The lowest gray level is that provided for optical output of 0.1 mW.) The number of photons provided by light pipes 24 that illuminate a modulation zone for any gray level of illumination is sufficient so that the vector processor can provide an accurate DCT transform of an 8×8 pixel image block having 8 bit gray level resolution.

The assumption in the above calculations that 50% of the attenuation of light in light pipes 24 is due to scattering requires that a scattering length for light at the wavelength provided by light sources 36 is about 96 mm. A scattering length in a light pipe is a function of a concentration of scattering particles in the material of the light pipe and a scattering cross section of the particles for the light. The inventors have determined concentrations of scattering particles in light pipes that are required to provide desired scattering lengths for light used to illuminate the light pipes, in accordance with embodiments of the present invention.

Various theoretical models and experimental data exist that describe scattering of light by particles. Lord Rayleigh developed a scattering model for light for which the wavelength of the light is much greater than the size of particles that scatter the light. Mie (1908) developed a scattering model that describes scattering of light from particles for which radii of the particles are between 0.1 and 10 times the wavelength of the scattered light. Substantial experimental data that describing scattering of light is available from studies of scattering of light in the atmosphere. The models developed by Rayleigh and Mie and experimental data for scattering of light are presented and discussed in a book entitled "Vision Through the Atmosphere" by W. E. Knowles Middleton; Toronto Press, 1952, the disclosure of which is incorporated herein by reference.

The book provides scattering cross sections from a single scattering particle. However, scattering of light in a light pipe that generates a flux of light particles from a transmission window of the light pipe, in accordance with an embodiment of the present invention, is a "many body problem" that involves repeated scattering of photons from many scattering particles. The inventors have used Rayleigh scattering cross sections to determine scattering lengths in light pipes used in vector processors, in accordance with embodiments of the present invention, as a function of wavelength of light used to illuminate the light pipes.

Figure 2:
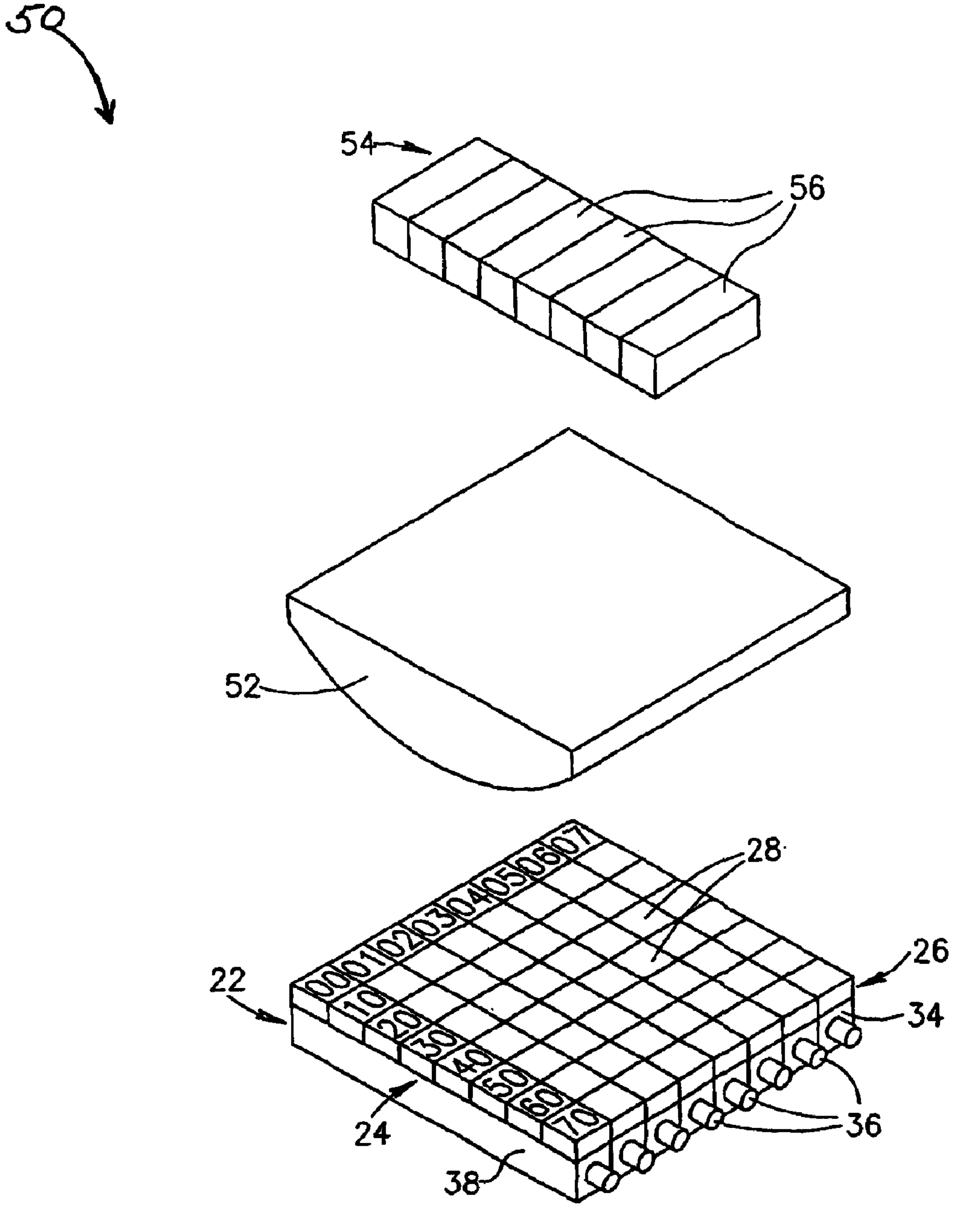
FIG. 2 schematically shows another vector processor, in accordance with an embodiment of the present invention.

FIG. 2 schematically shows an example of another optical vector processor 50 in accordance with an embodiment of the present invention.

Vector processor 50 is similar to vector processor 20 shown in FIGS. 1A and comprises a light pipe array 22 and an SLM 26 similar to light pipe array 22 and SLM 26 comprised in vector processor 20. However, in vector processor 50, light from each row of modulation regions 28 is not collected by an at least one light detector aligned with the row. Sensing light transmitted through each row of modulation zones 28 is, optionally, accomplished by a cylindrical lens 52 and a linear array 54 of light detectors 56.

Linear array 54 comprises a different light detector 56 for each row of modulation zones 28. Cylindrical lens 52 collects light passing through SLM 26 and images the collected light on detector array 54. Lens 52 and array 54 are positioned so that lens 52 images light from all modulation zones 28 in a same row of modulation zones on a same light detector 56 and light from modulation zones 28 in different rows on different detectors 56. To improve light collection efficiency, each light detector 56 is, optionally, an elongate light detector having a long axis parallel to the rows of modulation zones 28. In some embodiments of the present invention a lens, or lenses, in addition to lens 52, is used to focus light from a row of modulation zones 28 onto a detector 56. Whereas each light detector 56 is shown as a single light detector, each detector 56 optionally comprises a plurality of detectors positioned to receive light from substantially only one row of modulation zones 28.

Figure 3B:
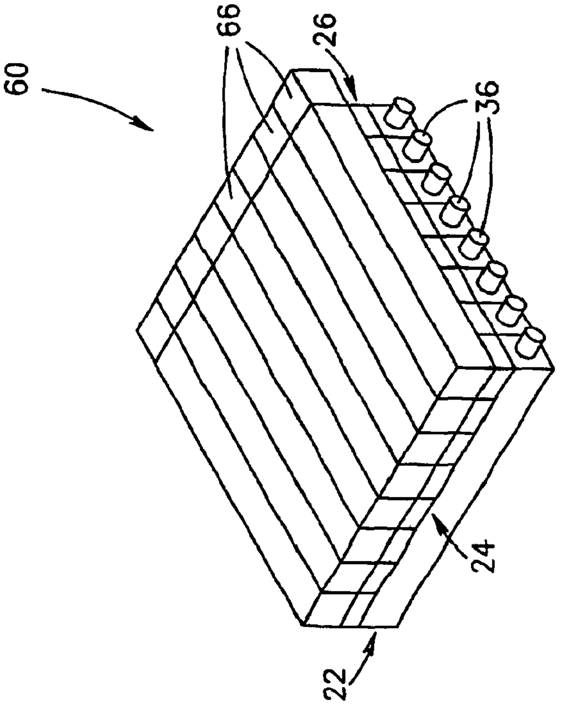
FIGS. 3A and 3B schematically show, respectively, a partial exploded view of yet another vector processor and a view of the optical vector processor assembled, in accordance with an embodiment of the present invention.
Figure 3A:
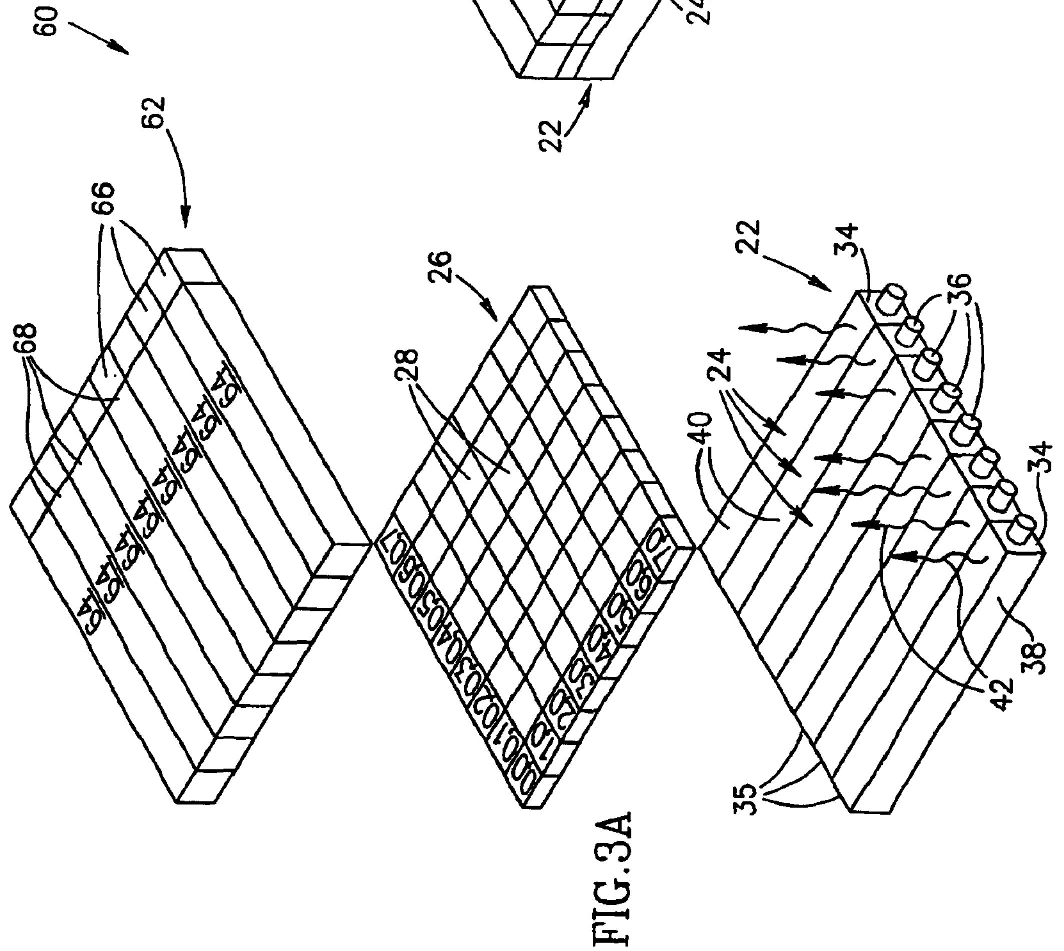

FIG. 3A schematically shows a partially exploded view of another optical vector processor 60, in accordance with an embodiment of the present invention. FIG. 3B schematically shows vector processor 60 assembled.

Vector processor 60 comprises a light pipe array 22 and an SLM 26. Light from rows of modulation zones 28 of SLM 26 is collected by an array 62 of, optionally, identical collecting light pipes 64. In some embodiments of the present invention, each light pipe 64 has a light collecting surface having a shape and size substantially the same as the shape and size of a row of modulation zones 28 of SLM 26. The light collecting surfaces of collecting light pipes 64 are on the underside of array 62 and are not shown in FIGS. 3A and 3B. By way of example, collecting light pipes 64 are shown as rectangular solids having a square cross section. Array 62 is aligned and positioned so that the light collecting surface of each collecting light pipe 64 is parallel to and, optionally, contiguous (FIG. 3B) with a single row of modulation zones 28.

Each collecting light pipe 64 receives light from each modulation zone 28 of the row of modulation zones with which the light pipe's collecting surface is contiguous. Collecting light pipes 64 are seeded with scattering particles (not shown). Some of the light from each modulation zone 28 in row of modulation zones that enters a light pipe 64 is scattered by the scattering particles. The scattered light is piped by the light pipe 64 to a light detector 66 coupled to a surface of the light pipe at an end 68 of the light pipe. Detector 66 generates a signal responsive to the total amount of light collected by the light pipe 64 from its row of modulation zones 28.

To enhance efficiency with which a light pipe 64 pipes light that it receives to its detector 66 surface regions of the light pipe that are not intended to transmit light are covered with a light reflecting material such as a metal or appropriate dielectric. Whereas each light pipe 64 in vector processor 60 is coupled to a single light detector 66 in some embodiments of the present invention each light pipe 64 is coupled to two light detectors 66, one at each end of the light pipe. A signal responsive to light collected by the light pipe is generated from a sum provided by each of the detectors.

The amount of light collected by a detector 66 is can be affected by crosstalk between light pipes 64 and light pipes 24. To reduce effects of crosstalk in reducing signal to noise ratio, the inventors have found that it is advantageous to determine an efficiency, hereinafter a "coupling efficiency", of light transfer between a light pipe 24 and a light pipe 64 so that it is below a threshold coupling efficiency. If "$\epsilon$" represents the threshold coupling efficiency and an optical processor similar to optical processor 60 has N light pipes 24 and a desired signal to noise ratio from cross talk is represented by "SNR" then $\epsilon^2 \leqq 4/(N^3\ \mathrm{SNR})$.

In some embodiments of the present invention, light provided by light pipes 24 is characterized by a first wavelength and collecting light pipes 64 are provided with wavelength converters that convert light that they receive from SLM 26 to light characterized by a second wavelength. Optionally the second wavelength is longer than the first wavelength. All surfaces of each collecting light pipe 64, except, optionally the surface of the light pipe to which light detector 66 is coupled, may be coated with a coating that is substantially transparent to light at the first wavelength but highly reflective of light at the second wavelength. The wavelength conversion increases efficiency of light collection by a light detector 66 and reduces inhomogeneity in light collection efficiency as a function of position at which light from SLM 26 enters the collecting light pipe 64 to which the detector is coupled. In addition the wavelength conversion reduces crosstalk between collecting light pipes 64.

Alternatively to coating surfaces of the collecting light pipes with material that reflects light at the second wavelength, other means, such as filters at the modulation zones or wavelength selective attenuators in SLM 26 may be used to reduce transmittance of second wavelength light between collecting light pies via SLM 26.

Light collection from rows of modulation zones 28 using a system of light collecting light pipes of the type shown in FIGS. 3A and 3B is less efficient than light collecting systems used with vector processors 20 and 50 shown in FIGS. 1A–2B. However, reduction of light collecting efficiency can be offset, at least partially, by using light sources that provide for more optical energy than light source used with vector processors 20 and 50.

In the description and claims of the present application, each of the verbs, "comprise" "include" and "have", and conjugates thereof, are used to indicate that the object or objects of the verb are not necessarily a complete listing of members, components, elements or parts of the subject or subjects of the verb.

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art. The scope of the invention is limited only by the following claims.

What is claimed is:

1. An optical signal processor for transforming a first vector into a second vector comprising:

a plurality of linear light sources each having a longitudinal surface and each emitting light along its longitudinal surface wherein said emitted light has an intensity responsive to a different component of the first vector;

a spatial light modulator comprising a plurality of modulation zones each of which zones receives light from substantially only one of the light sources and transmits light in proportion to a transmittance that characterizes the modulation zone; and at least one light detector for each component of the second vector that receives light transmitted from a plurality of modulation zones, each of which is illuminated by light from a different light source, and generates a signal responsive to the received light that represents a component of the second vector.

2. An optical processor according to claim 1 wherein the modulation zones are configured in an array of columns and rows of modulation zones.

3. An optical processor according to claim 2 wherein the array of modulation zones is a rectangular array.

4. An optical processor according to claim 2 wherein all the modulation zones in a same column of modulation zones are illuminated by light from a same light source.

5. An optical processor according to claim 4 wherein the at least one detector for each second vector component receives light transmitted from all the modulation zones in a different one of the rows of modulation zones.

6. An optical processor according to claim 5 wherein the at least one detector for each row of modulation zones has an aperture for collecting light that has a shape and size substantially equal to the shape and size respectively of the row of modulation zones from which it receives light.

7. An optical processor according to claim 6 wherein the aperture is contiguous with the row of modulation zones.

8. An optical processor according to claim 5 wherein efficiency of light transfer between a light source and a light detector for light at a wavelength that characterizes light provided by the light sources is less than a predetermined threshold efficiency $\epsilon$ that satisfies a relation $\epsilon^2 \leqq 4/(N^3 \times SNR)$ where N is a number of the plurality of light sources and SNR is a desired signal to noise ratio resulting from crosstalk.

9. An optical processor according to claim 5 and comprising optics that receives light transmitted from all the modulation zones in the spatial light modulator and images light from all modulation zones in each row of modulations zones to the row's at least one detector.

10. An optical processor according to claim 9 wherein the optics comprises a cylindrical lens that receives light transmitted from all the modulation zones and has its focal line substantially parallel to the rows of modulation zones and wherein the at least one light detectors for the modulation zone rows are positioned in a linear array perpendicular to the focal line so that light received from the modulation zones in a same row of modulation zones is imaged on a same one of the at least one light detectors.

11. An optical processor according to claim 5 and comprising a different collecting light pipe for each row of modulation zones in the spatial light modulator that receives light transmitted from the modulation zones in the row of modulation zones and pipes the received light and/or light generated in the light pipe responsive to the received light to the at least one light detector for the row of modulation zones.

12. An optical processor according to claim 11 wherein efficiency of light transfer between a light source and a light detector for light at a wavelength that characterizes light provided by the light sources is less than a predetermined threshold efficiency $\epsilon$ that satisfies a relation $\epsilon^2 \leqq 4/(N^3 \times SNR)$ where N is a number of the plurality of light sources mid SNR is a desired signal to noise ratio resulting from crosstalk.

13. An optical processor according to claim 11 wherein light provided by the light sources is characterized by a first wavelength and the collecting light pipes are provided with wavelength converters that convert light received by the light pipes from the modulation zones to light characterized by a second wavelength.

14. An optical processor according to claim 13 wherein the second wavelength is longer than the first wavelength.

15. An optical processor according to claim 13 wherein surface areas of the light pipe are coated with a coating that transmits light at the first wavelength and is highly reflective for light at the second wavelength.

16. An optical processor according to claim 11 wherein the collecting light pipe is a linear light pipe having two end surfaces and a light collecting surface that is a longitudinal surface region of the light pipe through which surface region light transmitted from the modulation zones in the row of modulation zones enters the light pipe.

17. An optical processor according to claim 16 wherein the light pipe is a rectangular solid having four rectangular side surfaces, one of which side surfaces is the light collecting surface.

18. An optical processor according to claim 17 wherein the light collecting surface has a shape and size substantially the same as the shape and size of the area of the row of modulation zones from which it collects light.

19. An optical processor according to claim 17 wherein the light collecting surface is contiguous with the row of modulation zones from which the light pipe collects light.

20. An optical processor according to claim 16 wherein the at least one light detector for a second vector component comprises a single light detector that is coupled to an end surface of the collecting light pipe.

21. An optical processor according to claim 16 wherein the at least one light detector comprises a light detector coupled to each end surface of the collecting light pipe.

22. An optical processor according to claim 1 wherein the relative amounts of light provided by any two light sources of the plurality of light sources for components of the first vector having a same value are adjusted so that a difference in an amount of light transmitted from the light sources through modulation zones having a same transmittance that reaches the at least one detector for each of the modulation zones is reduced.

23. An optical processor according to claim 1 wherein desired transmittances of modulation zones illuminated by a same light source are adjusted to compensate for differences in intensity of light along the longitudinal surface of the light source that illuminates the modulation zones.

24. An optical processor according to claim 1 wherein a ratio of areas of any two modulation zones illuminated by a same light source is substantially inversely proportional to the relative amounts of light that the modulation zones receive from the light source.

25. An optical processor according to claim 1 wherein the relative sensitivities of any two first and second at least one detectors are adjusted to reduce a difference in output signals that they provide when they receive light from modulation zones having a same transmittance that are illuminated by a same light source.

26. An optical processor according to claim 1 wherein the transmittance of each modulation zone in the spatial light modulator is fixed.

27. An optical processor according to claim 1 wherein the transmittance of each modulation zone in the spatial light modulator is controllable.

28. An optical signal processor according to claim 1 wherein each of the at least one light sources comprises a source light pipe that provides light from a longitudinal surface thereof to illuminate modulation zones of the spatial light modulator.

29. An optical signal processor according to claim 28 and comprising a light emitter coupled to an end surface of the source light pipe that illuminates the end surface with intensity of light responsive to a component of the first vector.

30. An optical signal processor according to claim 29 wherein the source light pipe is provided with light scattering elements.

31. An optical signal processor according to claim 30 wherein the density of the elements increases with distance from the end surface so as to improve uniformity of intensity of light exiting the longitudinal surface as a function of distance from the end surface.

32. An optical signal processor according to claim 1 wherein the light source is formed from a material that exhibits luminescence.

33. An optical processor according to claim 32 and comprising a light emitter that illuminates the luminescent material to excite luminescence therein having intensity responsive to a component of the first vector.

34. An optical processor according to claim 32 and comprising a source of electromagnetic field that generates an electromagnetic field in the luminescent material to excite luminescence therein having intensity responsive to a component of the first vector.

35. An optical signal processor according to claim 1 wherein each of the at least one light source comprises a linear fluorescent light emitter.

36. A method for transforming a first vector into a second vector comprising:

representing each component of the first vector by intensity of light provided by a linear light source having a longitudinal surface and emitting light along its longitudinal surface;

transmitting light from each light source through a plurality of modulation zones each of which transmits light in proportion to a transmittance that characterizes the modulation zone; and using light transmitted by all the modulation zones to generate a plurality of signals, each of which represents a different component of the second vector and wherein each signal is responsive to light transmitted by at least one of the modulation zones.

37. A method according to claim 36 wherein no two signals are responsive to light transmitted by a same modulation zone.

38. A method according to claim 36 wherein no signal is responsive to light from more than one modulation zone illuminated with light from a same light source.

39. A method according to claim 36 wherein each light source illuminates a same number of modulation zones.

40. A method according to claim 36 wherein each signal is substantially proportional to a total amount of light transmitted by all of the at least one of the modulation zones.

41. A method according to claim 36 wherein each signal is responsive to light transmitted by a plurality of the modulation zones.

42. A method of propagating an optical signal in a light pipe, the method comprising:

generating an optical signal with light characterized by a first wavelength for which light is substantially not reflected at the surface of the light pipe;

transmitting at least a portion of the light in the optical signal through a surface region of the light pipe so that it enters the light pipe; and converting the first wavelength light that enters the light pipe to light characterized by a second wavelength that is highly reflected by the surface of the light pipe.

43. A method of preventing cross talk between first and second light pipes optically coupled at first and second optical junctions to a same third light pipe so as to input optical signals to the third light pipe, the method comprising:

generating optical signals in the first and second light pipes that are input to the third light pipe with light characterized by a first wavelength for which light is transmitted at the first and second optical junctions;

converting the first wavelength light that enters the third light pipe to light characterized by a second wavelength that is not transmitted through the first and second optical junctions.

44. A method according to claim 43 wherein the second wavelength light is reflected at each of the first and second optical junctions.

45. A method according to claim 43 wherein the second wavelength light is absorbed at or in the vicinities of the first and second optical junctions.

* * * * *